(12) United States Patent
Matsumoto

(10) Patent No.: US 6,259,225 B1
(45) Date of Patent: Jul. 10, 2001

(54) STEPPING MOTOR CONTROL UNIT AND METHOD, PRINTER EMPLOYING THE SAME, AND INFORMATION RECORDING MEDIUM

(75) Inventor: Yoshiharu Matsumoto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/367,066

(22) PCT Filed: Dec. 9, 1998

(86) PCT No.: PCT/JP98/05582

§ 371 Date: Aug. 9, 1999

§ 102(e) Date: Aug. 9, 1999

(87) PCT Pub. No.: WO99/30411

PCT Pub. Date: Jun. 17, 1999

(30) Foreign Application Priority Data

Dec. 10, 1997 (JP) ................................................. 9-340155

(51) Int. Cl.$^7$ ...................................................... H02P 8/00
(52) U.S. Cl. ........................... 318/696; 318/685; 318/138; 318/254; 318/439
(58) Field of Search ................................. 318/696, 685, 318/138, 254, 439; 310/216

(56) References Cited

U.S. PATENT DOCUMENTS 4,361,790 * 11/1982 Laesser et al. ..................... 318/696
4,869,610    9/1989 Nishizawa et al. .
4,899,073 *  2/1990 Takeuchi et al. ................... 310/116

FOREIGN PATENT DOCUMENTS

| 57-58880 | 12/1982 | (JP) . |
| 59-48181 | 3/1984 | (JP) . |
| 2-266967 | 10/1990 | (JP) . |
| 5-15197 | 1/1993 | (JP) . |
| 2563789 | 9/1996 | (JP) . |

OTHER PUBLICATIONS

Hajime Ohki (Jikkyo Publishing Co. Ltd.), "Theory and Application of Stepping Motors," 1979, p. 162.

* cited by examiner

Primary Examiner—Karen Masih
(74) Attorney, Agent, or Firm—Michael T. Gabrik

(57) ABSTRACT

A stepping motor control unit is capable of driving a stepping motor fast through feedback control. Slits bored in a disk fixed to a rotor of a stepping motor are located at positions that precede magnetically stable positions of the rotor in a direction of rotation of the rotor. Light passing through the slits is detected by an optical sensor, and a signal t is output thereby. The signal t is delayed by a predetermined time according to the rotating speed of the rotor and then transmitted to a control unit. The control unit receives a position detection signal earlier according to the rotating speed of the rotor. Therefore, the wait time required for switching phases can be shortened. Moreover, when the signal t is generated twice or more during a signal t detection time during which a signal t indicating a certain phase is detected, the second and subsequent signals t are ignored. Thus, incorrect detection can be avoided.

20 Claims, 7 Drawing Sheets

STEPPING MOTOR CONTROL UNIT AND METHOD, PRINTER EMPLOYING THE SAME, AND INFORMATION RECORDING MEDIUM

TECHNICAL FIELD

The present invention relates to a stepping motor control unit and method, a printer employing them, and an information recording medium. More particularly, this invention relates to a stepping motor control unit and method, a printer employing the same, and an information recording medium, wherein a stepping motor is controlled by feeding back the magnitude of rotation in order to ensure a high rotating speed of the stepping motor, or a high print head moving speed or high paper feeding speed of a printer driven by the stepping motor.

BACKGROUND ART

The stepping motor is one type of motor for supplying power by rotating a rotor. The stepping motor has a plurality of phases magnetically defined therefor. The state of an applied magnetic field is predetermined in association with each phase. The rotor of the stepping motor has a stable orientation thereof determined in association with each phase or magnetic state. The stable orientation is a orientation in which the rotor is stable in terms of magnetic energy. When a magnetic field associated with a certain phase is applied, the rotor rotates to assume a stable orientation at the phase. When the rotor reaches the phase to assume the stable orientation, if a magnetic field associated with another phase is applied, the rotor rotates to assume the next stable orientation. If this sequence is repeated, the rotor can be rotated continuously. An angular movement made to switch one phase into another shall be referred to as one step. The time during which a magnetic field associated with a certain phase is applied shall be referred to as a step time.

The stepping motor is adopted as, for example, a print head moving unit or paper feeding unit for a printer because the magnitude of rotation (rotation angle) of the rotor can be controlled accurately. When the stepping motor is adopted as the print head moving unit for a printer, the stepping motor is initially stopped or is not rotated, then is rotated and accelerated, is rotated on steadily, is rotated and decelerated, and is then stopped again. This cycle is repeated.

The step time required for each step is measured experimentally in advance. Measured step times are stored in a recording medium such as a read-only memory (ROM). The stepping motor is then driven based on the set step times according to each state of rotation (acceleration, steady rotation, or deceleration). This technique is often adopted.

However, the stepping motor is different from product to product due to manufacturing or use conditions. Moreover, the print head moving unit for a printer, or the paper feeding unit therefor, is different from product to product in terms of load to be imposed during driving because of the manufacturing or use conditions. The magnitude of rotation of the stepping motor therefore cannot be controlled accurately by merely designating step times. Consequently, the magnitude of movement of the print head in a printer or the magnitude of paper feed therein cannot be controlled accurately.

Feedback control is adopted as a means for overcoming the foregoing drawbacks. More particularly, a means shown in FIG. 7 is employed.

(a) A disk 703 having slits 702 coincident with phases is attached to a rotor 701 of a stepping motor. The disk 703 rotates about an axis of rotation 700 together with the rotor.

(b) An optical sensor 704 and a projector 705 are located on a portion of the stepping motor that is not rotated, for example, on a stepping motor body. Light emanating from the projector 705 passes through the slits 702 and reaches the optical sensor 704.

(c) The motion of the rotor is detected using the slits 702, optical sensor 704, and projector 705. When the rotor is rotated, a signal (hereinafter, a signal t) is generated by the optical sensor 704.

(d) A magnetic field associated with a certain phase is constantly applied over a predetermined step time. The step time is set to a value recorded in advance on, for example, a ROM.

(e) When the predetermined step time elapses, it is determined from the signal t whether the rotor has been rotated.

(f) The magnetic field associated with the phase is constantly applied until the rotor assumes a stable orientation. The rotor will not be shifted to the next phase until the signal t demonstrates that the rotor has assumed the stable orientation.

The control steps (e) and (f) can be achieved by means of a rotor control circuit (not shown) realized with, for example, a logic circuit.

(g) The control steps (d) to (f) are repeated in order to rotate the rotor 701 continuously.

The slits 702 are bored as thinly as possible and are positioned at the center of between stable positions so that the rotor of a stepping motor is rotated bi-directionally according to the above control sequence.

However, when the stepping motor is controlled as mentioned above, there is difficulty in driving the stepping motor fast. This is because when phases are switched after the signal t is output, a large electrical advance angle cannot be attained and sufficient torque cannot be exerted. It has been discovered that the signal t is often generated late for a predetermined step time, especially in either of the following states:

(a) a state established from the instant the stepping motor is stopped to the instant it is accelerated; or (b) a state of steady rotation.

When the stepping motor is accelerated to be driven fast or rotated on a steady basis, a wait time required until the stepping motor receives the signal t becomes longer. For example, when the stepping motor is adopted as a print head moving unit for a printer, it takes substantial time to accelerate. Consequently, a distance by which a print head can move in a state of steady rotation becomes shorter. The time required for the print head to reciprocate once is prolonged. Otherwise, since the stepping motor cannot be shifted to the next phase until the signal t is detected, a desired moving speed at which the print head is moved cannot be attained in the state of steady rotation.

Moreover, for driving the stepping motor fast, it is necessary to decrease the number of times, by which phases are switched for acceleration or deceleration, as much as possible. However, to decrease the number of times, energy to be given to the motor must be increased. Consequently, the rotor may be rotated too far. However, this depends on a product or a driven state. Another signal t may then be generated to indicate the next magnetically stable position. This incident occurs frequently, especially during deceleration. Consequently, the foregoing feedback control cannot be extended accurately.

A means for overcoming the above drawback is, for example, described in "Theory and Application of Stepping Motors" written by Hajime Ohki (Jikkyo Publishing co., Ltd, 1979, P. 162), wherein a plurality of optical sensors is employed. However, this means has a drawback in that control is complex and the cost of manufacturing is increased.

The present invention attempts to overcome the above drawbacks. An object of the present invention is to provide a stepping motor control unit and method suitable for fast driving, a printer employing the same, and an information recording medium.

DISCLOSURE OF THE INVENTION

A stepping motor control unit in accordance with the present invention comprises the following means:

(a) a rotor for supplying power from a stepping motor;

(b) a magnetic field applying means having a plurality of phases, to which the rotor is rotated, defined therefor;

(c) an orientation detecting means that has a first stable position and second stable position, to which the rotor is rotated by predetermined angles from a magnetically stable orientation in a direction in which the rotor is rotated, associated with a plurality of phases, and that when the rotor is rotated from the first stable position to the second stable position, detects the rotor at a given position near the first stable position;

(d) a control means for, after magnetic fields applied by the magnetic field applying means are switched for designating a phase corresponding to the second stable position, when a predetermined step time elapses and a detection signal is output from the orientation detecting means, switching magnetic fields for designating a phase corresponding to a third stable position.

According to the present invention, a large electrical advance angle can be attained, and sufficient torque can be exerted. Eventually, the stepping motor can be driven fast.

Moreover, a stepping motor control unit in accordance with the present invention comprises the following means:

(a) a rotor for supplying power from a stepping motor;

(b) a magnetic field applying means having a plurality of phases, to which the rotor is rotated, defined therefor;

(c) an orientation detecting means that has a first stable position and second stable position, to which the rotor is rotated by predetermined angles from a magnetically stable orientation in a direction in which the rotor is rotated, associated with a plurality of phases, and that when the rotor is rotated from the first stable position to the second stable position, detects the rotor at a given position near the first stable position;

(d) a delay means for delaying a detection signal output from the detecting means by a predetermined delay time and outputting a resultant signal as a feedback signal; and (e) a control means for, after magnetic fields applied by the magnetic field applying means are switched for designating a phase corresponding to the second stable position, when a predetermined step time elapses and a feedback signal is output, switching magnetic fields for designating a phase position corresponding to a third stable position.

According to the present invention, when a stepping motor is controlled through feedback, a wait time required for switching phases can be shortened drastically.

In this case, the given position is preferably deflected from the plurality of phases by any electrical advance angle ranging from 15° to 35°.

In this case, the orientation detecting means includes a disk fixed to the rotor and having a plurality of bored slits, and an optical sensor for detecting light that has passed through the slits. The optical sensor outputs a detection signal. An orientation detecting means having similar slits and a similar optical sensor and included in a conventional stepping motor control unit may be utilized, thus avoiding an increase in cost.

Furthermore, the orientation detecting means includes a filtering means for, when the detection signal is detected twice or more during a detection signal detection time preceding the step times, which are required to reach the plurality of phases, by a predetermined time, inhibiting output of the second and subsequent detection signals. Consequently, the orientation of the rotor can be prevented from being incorrectly recognized, especially during acceleration or deceleration of the stepping motor.

Furthermore, a recording medium is included for recording the predetermined step times required to reach the plurality of phases, a time by which the detection signal detection time precedes the predetermined step times required to reach the plurality of phases, and/or the predefined delay time. The control means controls the magnetic field applying means according to the times recorded on the recording medium. Consequently, a compact stepping motor control unit can be provided exclusively for a specified purpose of use.

In this case, preferably, the time, by which the detection signal detection time precedes the predetermined step times required to reach the plurality of phases, shortens as the predictable rotating speed at which the rotor rotates increases proportionally to the step times. This results in a stepping motor control unit enjoying a short wait time required to initiate acceleration, steady rotation, or deceleration.

Moreover, a stepping motor control unit in accordance with the present invention can be adapted to a print head moving unit and/or paper feeding unit for a printer. The adaptation of the stepping motor control unit leads to a drastically shortened printing time or paper feeding time compared with those required conventionally.

Moreover, a stepping motor control method in accordance with the present invention comprises the following steps:

(a) a step of associating a first stable position and second stable position, to which the rotor is rotated by predetermined angles from a magnetically stable orientation in a direction in which the rotor is rotated, with a plurality of phases; and, when the rotor is rotated from the first stable position to the second stable position, detecting the rotor at a given position near the first stable position and outputting a detection signal; and (b) a step of, after magnetic fields applied by a magnetic field applying means are switched for designating a phase position corresponding to the second stable position, when a predefined step time elapses and a detection signal is output, switching magnetic fields for designating a phase corresponding to a third stable position.

According to the present invention, a large electrical angle can be attained and sufficient torque can be exerted. The stepping motor can therefore be driven fast.

Moreover, a stepping motor control method in accordance with the present invention comprises the following steps:

(a) a step of associating a first stable position and a second stable position, to which the rotor is rotated by predetermined angles from a magnetically stable orientation in a direction in which the rotor is rotated, with a plurality of phases; and when the rotor is rotated from the first stable position to the second stable position, detecting the rotor at a given position near the first stable position and outputting a detection signal;

(b) a step of delaying the detection signal by a predetermined delay time and outputting a resultant signal as a feedback signal; and (c) a step of, after magnetic fields applied by the magnetic field applying means are switched for designating a phase corresponding to the second stable position, when a predetermined step time elapses and the feedback signal is output, switching magnetic fields for designating a phase corresponding to a third stable position.

According to the present invention, when a stepping motor is controlled through feedback, a wait time required for switching phases can be shortened drastically.

Furthermore, the orientation detecting step includes a filtering step of, when the detection signal is detected twice or more during a detection signal detection time preceding the step times required to reach the plurality of phases by a predetermined time, inhibiting output of the second and subsequent detection signals. Consequently, the orientation of the rotor is prevented from being recognized incorrectly during acceleration or deceleration of the stepping motor.

Moreover, a control method in accordance with the present invention can be provided in the form of a control program executable by a control unit. An information recording medium in which the program is recorded can be released or sold independently and readily as a software package.

BEST MODE FOR CARRYING OUT THE INVENTION

An embodiment of the present invention will be described below. The embodiment will be described for explanatory purposes and does not restrict the scope of the present invention. A person of ordinary skill in the art will be able to construct variants using the constituent features of the embodiment or equivalents. The variants will be included in the scope of the present invention.

For overcoming a drawback in that a signal t is generated with delay during acceleration intended to drive a stepping motor fast or during steady rotation, the positions and shape of slits to be bored in a disk attached to a rotor should be devised so that the signal t will be generated earlier. For example, the slits are positioned so that the edges of the slits will precede magnetically stable positions by any of electrical advance angles ranging from 15° to 35° in a direction of rotation. The edge of each slit is the part of the slit that triggers the signal t. If the positions of the slits are advanced too far, the signal t is generated by even microscopic vibrations that are characteristic of a normal stepping motor. The microscopic vibration may be regarded as a sign that the stepping motor is operating normally. The above range of electrical advance angles is determined to overcome even this drawback.

Figure 1:
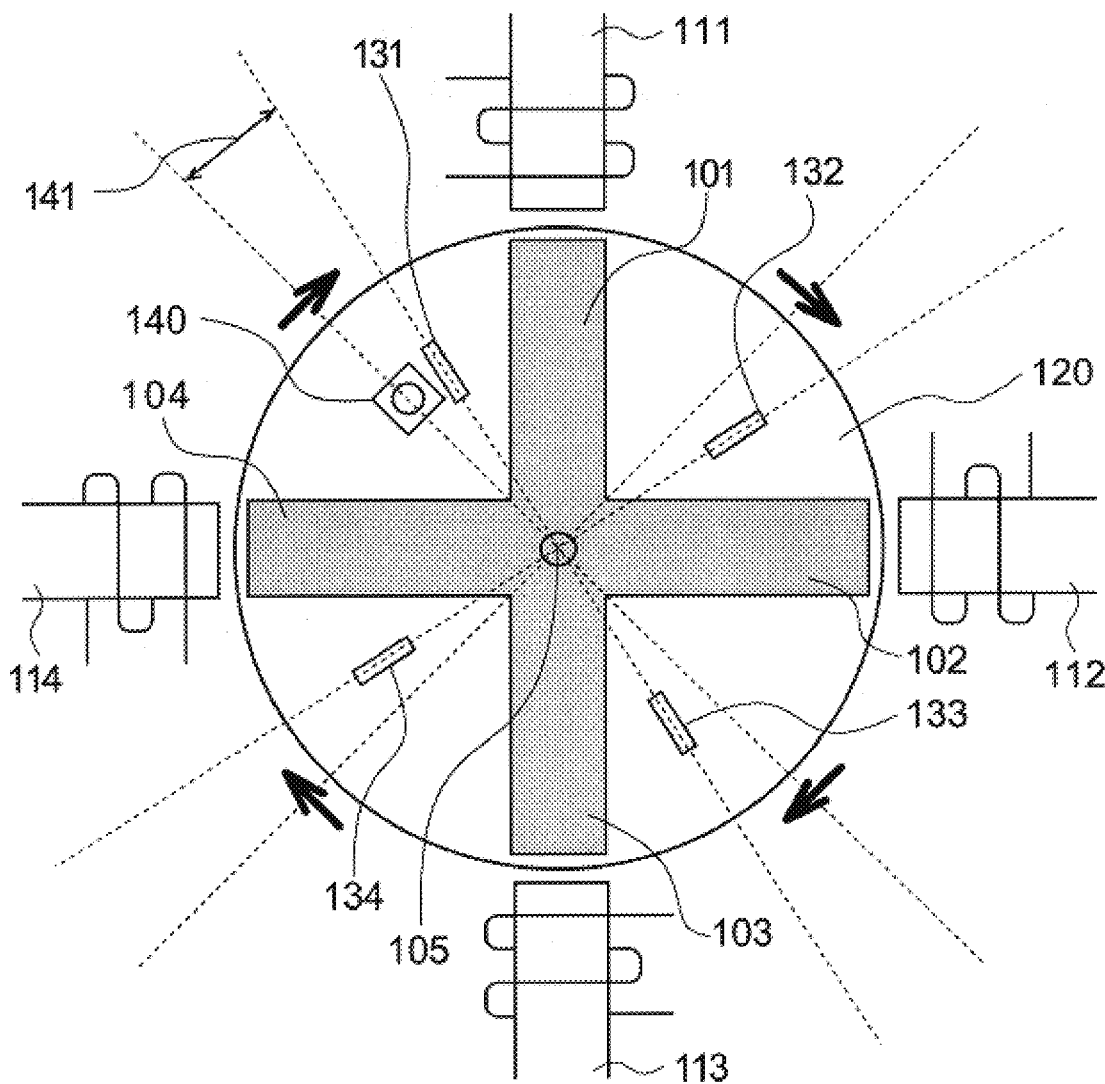
FIG. 1 is an explanatory diagram concerning detection of the rotation of a stepping motor that rotates unidirectionally according to the present invention.

In the case of a stepping motor that rotates exclusively unidirectionally, the width of slits is similar to that adopted conventionally. The positions of the slits are changed by any of the above electrical advance angles in a direction of rotation in which the stepping motor is rotated. FIG. 1 shows an embodiment of the stepping motor.

The stepping motor shown in FIG. 1 has a rotor with four arms 101, 102, 103, and 104, electromagnets 111, 112, 113, and 114, and a disk 120. The four arms are formed with material that can be magnetically guided, for example, iron chips. The rotor rotates about a center axis 105. The electromagnets attract the arms magnetically to rotate the rotor. The disk is coupled to the rotor.

The stepping motor has four magnetically stable positions defined therefor. Thereat four slits 131, 132, 133, and 134 are bored equidistantly in the disk. In the drawing, the rotor is assuming one stable orientation. Moreover, the stepping motor rotates clockwise as illustrated.

The number of magnetically stable positions can be modified properly within the scope of the present invention according to a usage or a purpose of use. For example, stepping motors having 20, 24, and 48 magnetically stable positions have been manufactured and delivered in practice. Moreover, the number of slits is the same as the number of magnetically stable positions.

An optical sensor 140 is, as illustrated, located to deflect from the slits 131 to 134 by an angle 141 in a direction opposite to the direction of rotation. In short, the slits 131 to 134 are located at positions preceding positions by the angle 141, at which the rotor assumes a stable orientation, in the direction of rotation of the rotor.

In the drawing, the slits 131 to 134 pass light coming from the back of the paper. The optical sensor 140 located on the surface of the paper detects the light.

Once the positional relationships among the slits 131 to 134 and the optical sensor 140 is established, as mentioned above, a signal t will be generated earlier than conventionally.

Figure 2:
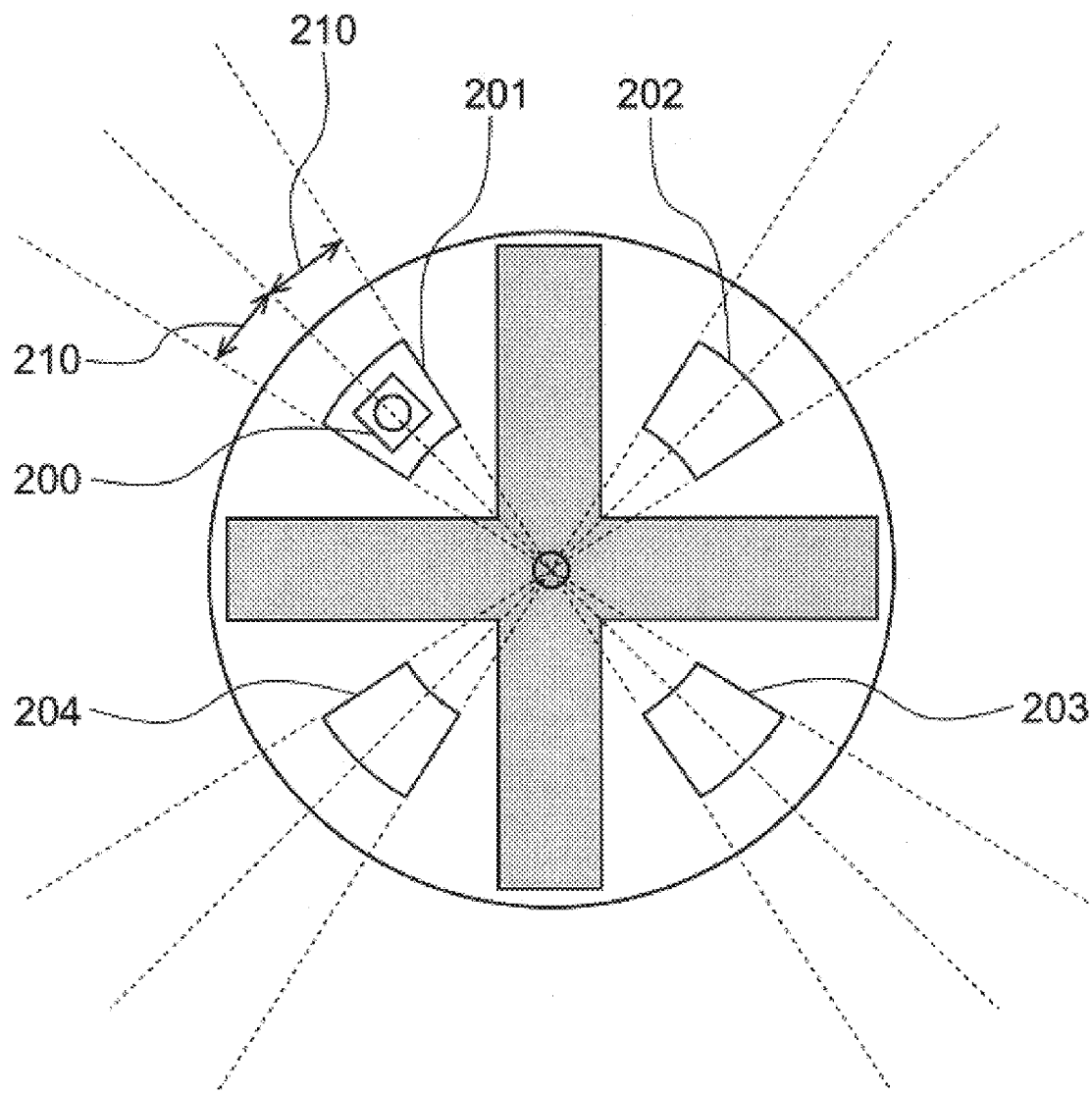
FIG. 2 is an explanatory diagram concerning detection of the rotation of a stepping motor that rotates bi-directionally according to the present invention.

In the case of a stepping motor that rotates bi-directionally, circumstances change. When a stepping motor in accordance with the present invention is adapted to a printer head moving unit for a printer, a rotor is often rotated bi-directionally in conformity with the reciprocating motion of the print head. In this case, the ends of slits are widened symmetrically in both directions of rotation by any of the aforesaid electrical advance angles. The entire width of the slits is made larger than that of conventional slits. FIG. 2 shows the slits.

FIG. 2 shows a stepping motor in one magnetically stable orientation. The stepping motor has an optical sensor 200 and wide slits 201, 202, 203, and 204. The edges of the slits will be separated from the center of the optical sensor 200 by an angle 210. A detection signal output from the optical sensor 200 is generated when the edge of each slit passes through the optical sensor 200. In whichever of the directions the stepping motor is rotated, the detection signal is generated earlier.

Compared with the slits shown in FIG. 1, the slits shown in FIG. 2 have edges thereof deflecting from the optical sensor when they are seen with the rotor in stable orientations. Therefore the entire width of the slits is made larger.

Owing to the technique of deflecting slits or widening slits, the signal t is generated earlier. During acceleration intended to drive a stepping motor fast, or during steady rotation, a wait time required to wait for the signal t can be reduced drastically.

Figure 3:
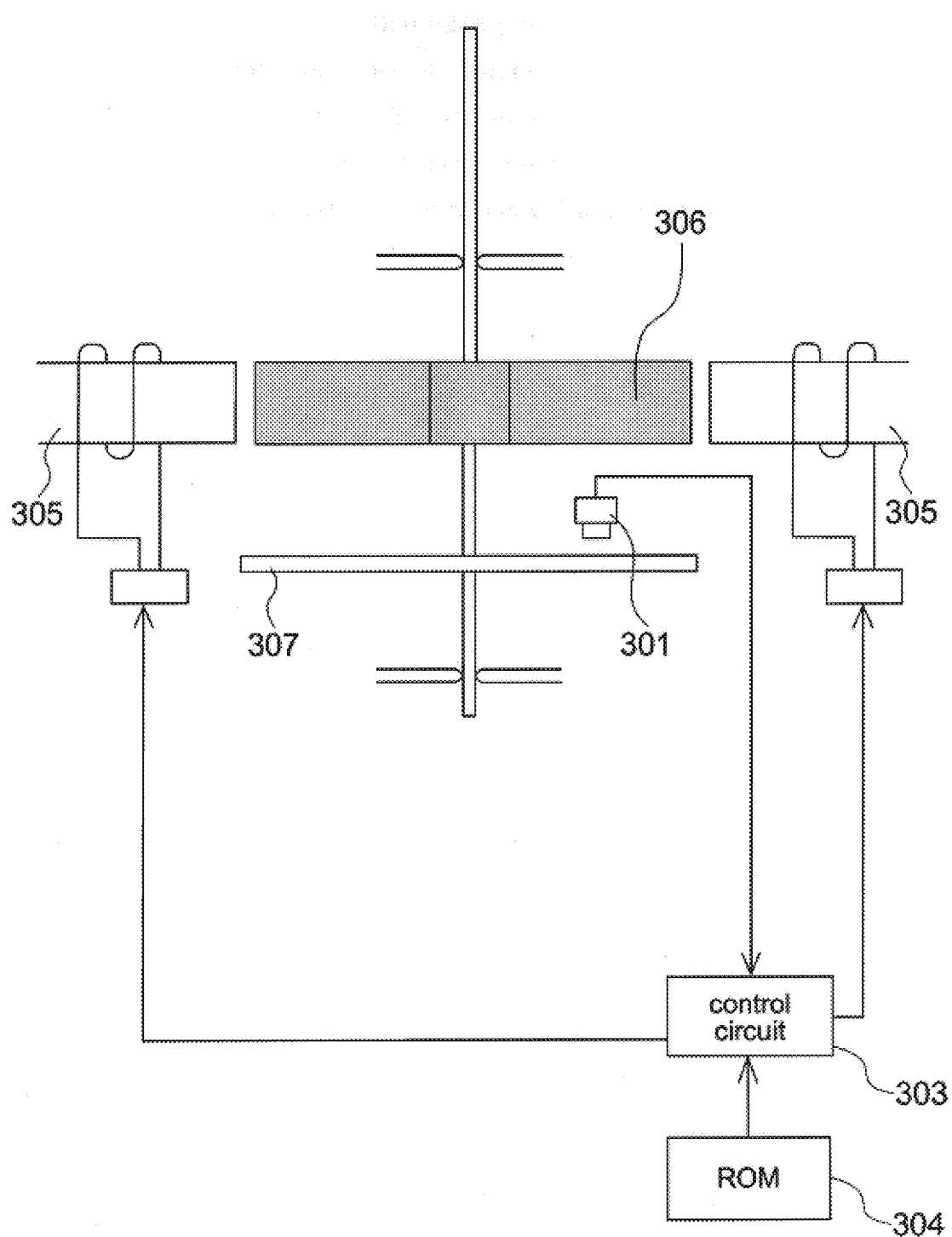
FIG. 3 shows the configuration of a stepping motor control unit in accordance with the present invention.

FIG. 3 shows an example of embodiments of a stepping motor control unit in accordance with the present invention. A disk 307 that rotates together with a rotor 306 about an axis of rotation has slits. Light passing through the slits is detected by an optical sensor 301. A detection signal output from the optical sensor is transmitted to a control unit 303. Step times are recorded in a ROM 304. The control unit 303 reads the step times from the ROM to control electromagnets 305.

During steady rotation during which a stepping motor is not driven fast, when the rotor is rotated, the signal t need not be generated earlier. During steady rotation which is not fast rotation, the signal t is delayed by a certain time by a delay element. An output of the delay element is used as a feedback signal. A delay time by which the delay element delays the signal is varied depending on, for example, the rotating speed of the rotor. Thus, the aforesaid object is accomplished.

Figure 4:
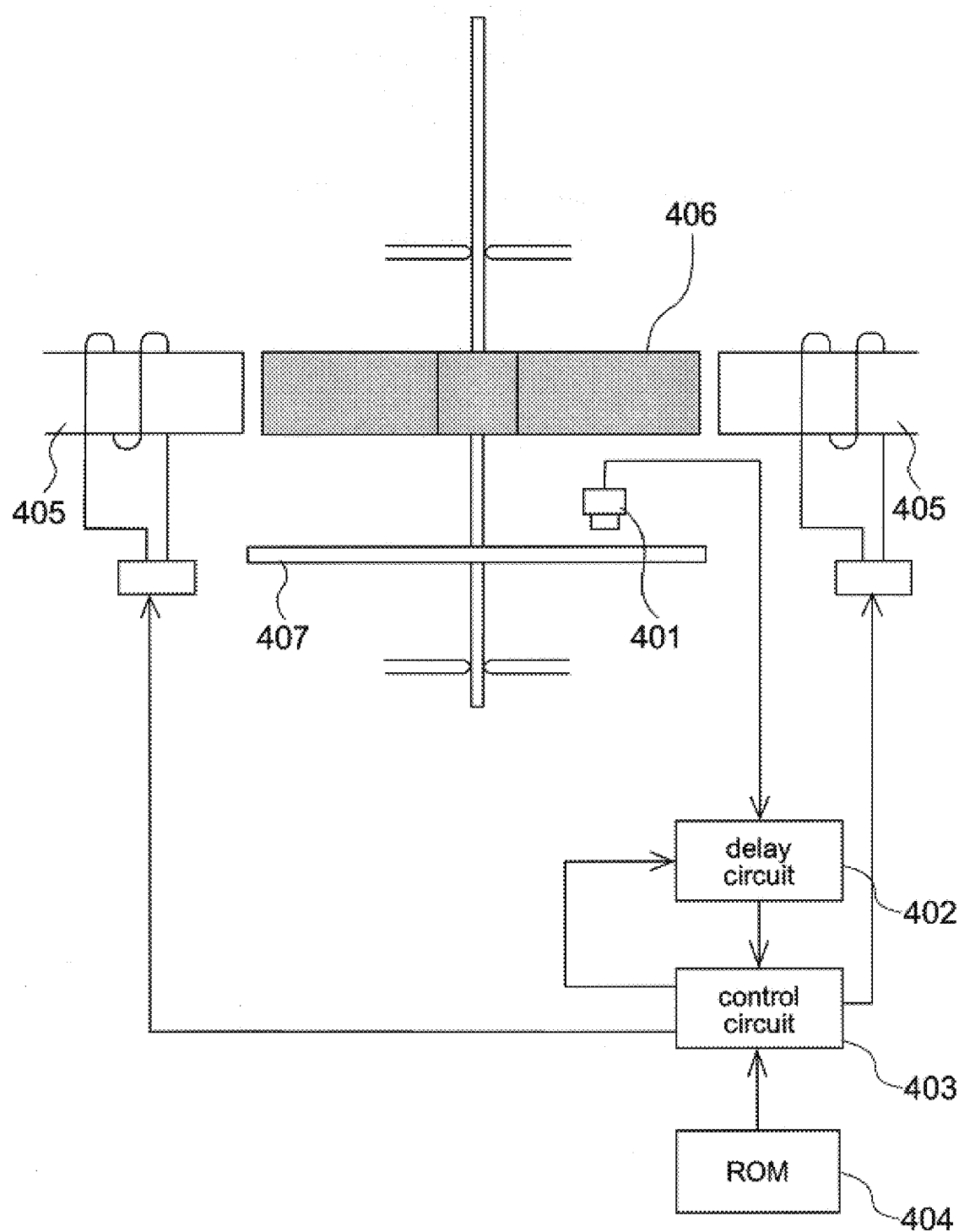
FIG. 4 shows the configuration of another stepping motor control unit in accordance with the present invention.

FIG. 4 shows an embodiment of the above case. A disk 407 that rotates together with a rotor 406 about an axis of rotation has slits. Light passing through the slits is detected by an optical sensor 401. A detection signal output from the optical sensor is transmitted to a control circuit 403 via a delay circuit 402. Step times and delay times are recorded in a ROM 404. The control circuit 403 reads the times from the ROM to make a judgment, and controls electromagnets 405. Moreover, the control circuit 403 adjusts a delay time, by which the delay circuit 402 delays a signal, according to the rotating speed of the rotor 406.

An object of this embodiment is to make it possible to recognize the signal t earlier by a time interval δ from a predetermined time instant at which phases are switched. The predetermined time instant is, in other words, a time instant at which the rotor is expected to assume a magnetically stable orientation. Moreover, the time δ is varied depending on the rotating situation of the rotor.

For example, the present inventors could increase the rotating speed by 15% to 25% by setting the time δ as described below:

δ=0.00 msec during steady rotation (1380 pps or 690 pps)

δ=1.20 msec during accelerated rotation at 333 pps or lower

δ=0.5 msec during accelerated rotation at rotating speeds ranging from 333 pps to 740 pps δ=0.15 msec during accelerated rotation at 740 pps or higher In the aforesaid example including a delay element, a time δ associated with an on-going specific step time is read from the ROM. The signal t output from the optical sensor is delayed by the time δ and is then transmitted.

The largest range of values of the time interval δ is determined by two factors; that is, a deflection of each slit expressed as an electrical advance angle and a rotating speed. Consequently, the time δ can be designated in association with a certain step time, a deflection from a magnetically stable position expressed as an electrical angle, or any other value that can be converted into the step time or deflection.

The time δ is, as mentioned above, varied properly depending on the rotating speed of the rotor. An actual rotating speed may be detected using a sensor or the like, and then the time δ may be varied. Moreover, when the stepping motor in accordance with the present invention is adapted to a print head moving unit for a printer, the rotating speed of the rotor may be calculated in association with each of the step times. The step times corresponding to reciprocating moving of a print head are recorded on a ROM or the like. Preferable times δ for the calculated rotating speeds may then be measured by conducting a simulation or an experiment. The measured times δ are also recorded in the ROM.

Additionally, the rotor of a stepping motor may be different from product to product in terms of the rotating characteristics of acceleration intended to drive the stepping motor fast or at steady rotation. Even in this case, owing to the foregoing technique, a delay time by which detection of signal t is delayed after a predetermined step time elapses can be reduced drastically.

In many applied fields, the stepping motor adopting the foregoing technique works satisfactorily. However, according to the technique, detection of the signal t is achieved earlier than conventionally. When the stepping motor is actually driven, the rotor may rotate too far during acceleration or deceleration. Alternatively, the rotor may pass through a magnetically stable position and return. This vibratory phenomenon may cause problems. These problems are significant, especially when the print head of a printer must be reciprocated quickly.

The problems will be discussed in detail. When a rotor passes through a magnetically stable position, a signal t is generated once. The rotor passes through the stable position due to the inertia of the rotor or a unit. The rotor then rotates in reverse to return to the stable position. When these actions are repeated, vibrations occur. Consequently, the signal t may be generated twice or more. In principle, the signal t must be generated once at each phase, or in other words, in one-to-one correspondence with each phase. This correspondence may be destroyed. There is a fear that the magnitude of rotation to be made by the rotor of a stepping motor may not be controlled accurately.

For overcoming the above drawback, a method of detecting the signal t has been devised. Namely, when the signal t is generated a plurality of times within a detection time within which the signal t is detected, the second and subsequent signals t are ignored. The detection time corresponds to a step time required to reach a phase.

Figure 5:
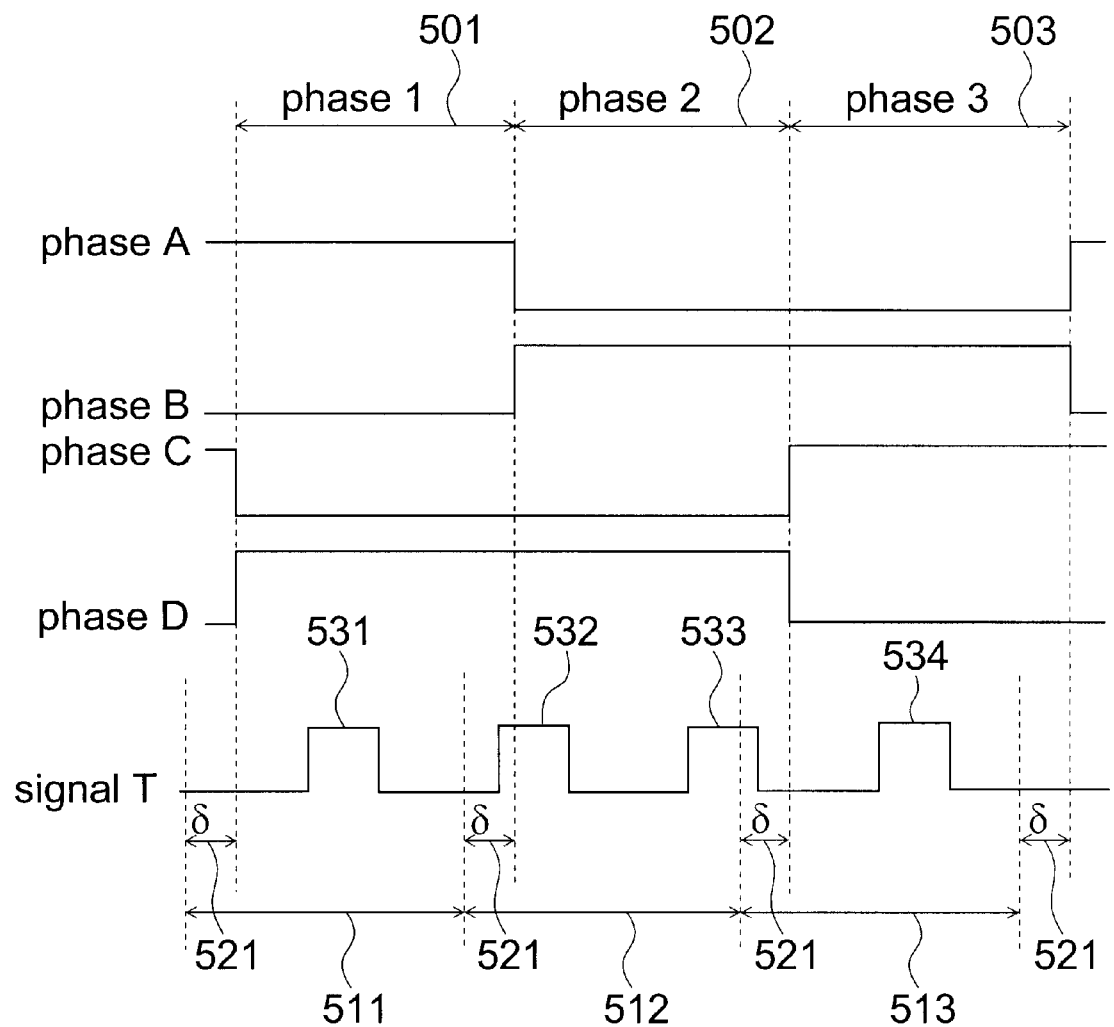
FIG. 5 shows the relationship among phases to which a stepping motor in accordance with the present invention is rotated, step times, and a signal t detection time.

Referring to FIG. 5, the above detecting method will be described below. Detection times 511, 512, and 513 required to detect the signal t correspond to step times 501, 502, and 503 required to reach phases 1, 2, and 3. The detection times 511 to 513 required to detect the signal t precede the step times 501 to 503 by the predetermined time δ 521.

Herein, the signal t is generated once as a pulse 531 during the detection time 511. The signal t is generated twice as pulses 532 and 533 during the detection time 512. The signal t is generated once as a pulse 534 during the detection time 513. Among the pulses, the signal t whose occurrence is construed as a condition for switching phases is thought to include three pulses 531, 532, and 534. With the pulses, phase 1 is switched to phase 2, phase 2 is switched to phase 3, and phase 3 is switched to the next phase.

The t pulse 533 is detected secondly during the signal t detection time 512. The t pulse 533 is ignored because the secondly detected t pulse is thought to be an incorrect pulse stemming from inverse rotation of the stepping motor (vibrations). Hereby the timing of the t pulse is matched with the timing of switching phases. Owing to this processing, the magnitude of rotation to be made by the rotor of a stepping motor can be controlled accurately.

Figure 6:
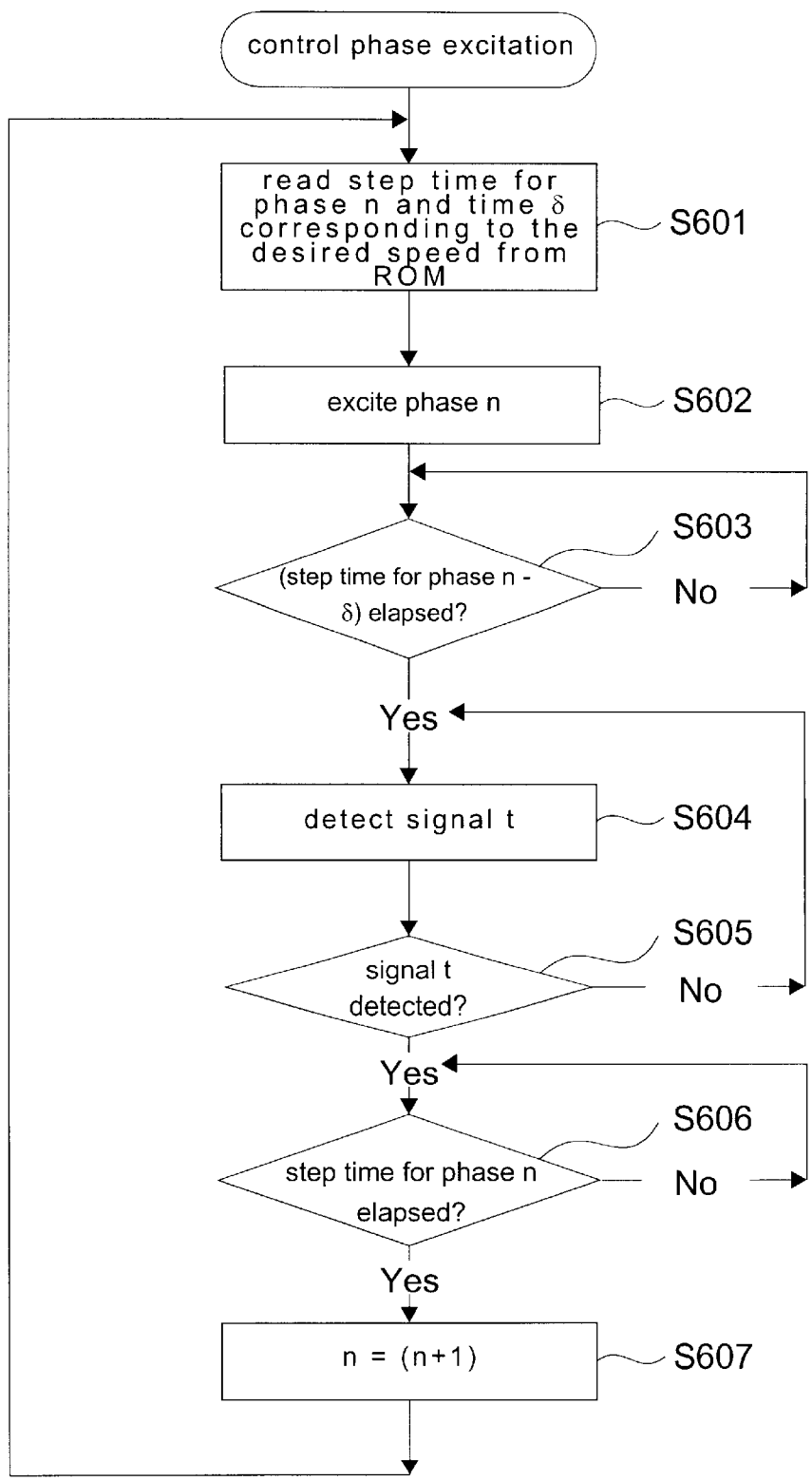
FIG. 6 is a flowchart describing a stepping motor control method in accordance with the present invention.
Figure 7:
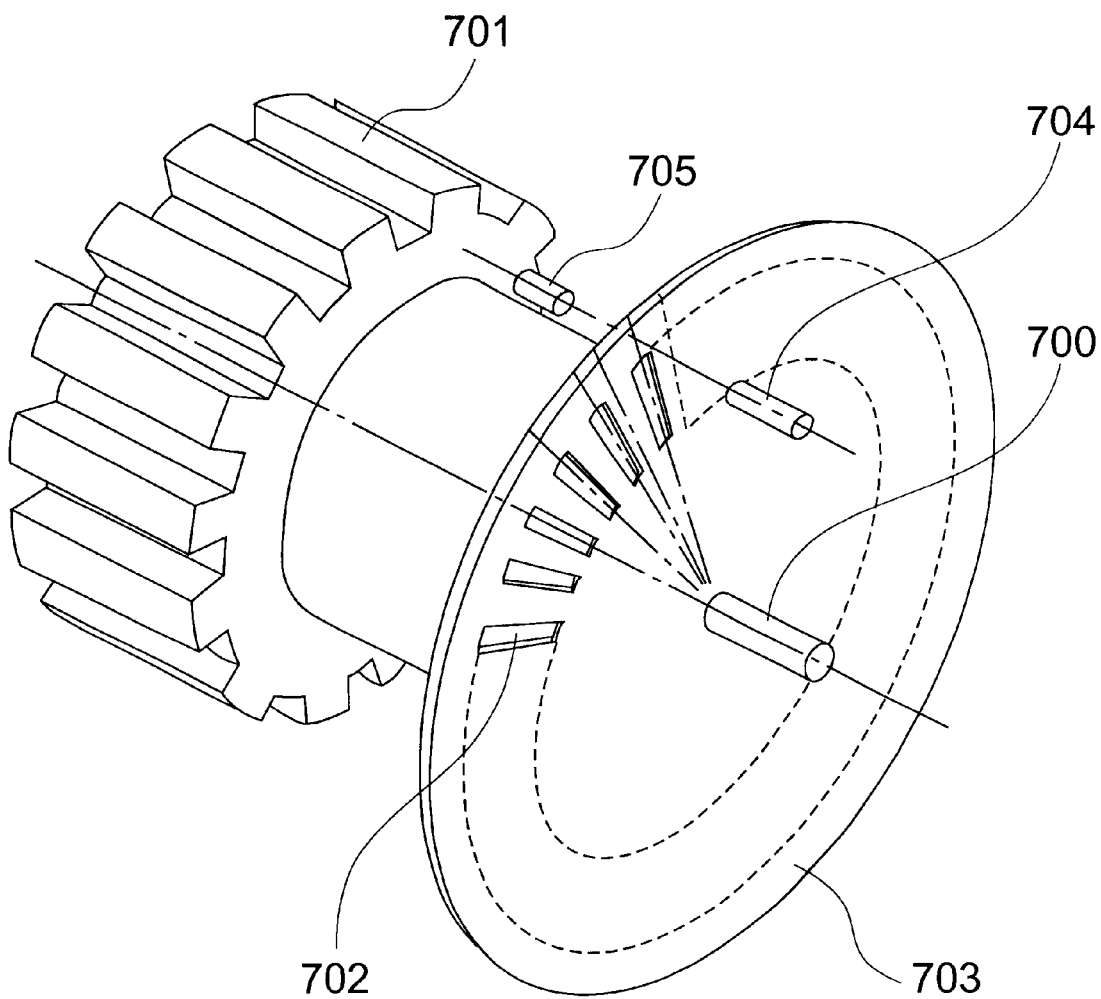
FIG. 7 is a schematic diagram showing a conventional stepping motor control unit.

A stepping motor control method in accordance with the present invention will be described in conjunction with the flowchart of FIG. 6. To begin with, a step time required to drive a stepping motor at a desired speed and a time δ associated with the speed are read from a recording medium such as a ROM (S601). An electromagnet associated with phase n is excited in order to drive the stepping motor (S602).

Thereafter, when a time equivalent to a difference between a step time and time δ has elapsed (S603), it comes at a time an instant earlier by the time δ than the step time required to reach phase n. At this time, a signal t is detected (S604). When the signal t is output before the start of the time δ, the signal t is thought to stem from vibrations (overshoot) of the stepping motor. The stepping motor is therefore thought to return to phase n. When the signal t is output within the time δ, the stepping motor is thought to rotate to the next phase (phase n+1) due to its inertia. Namely, the time δ is set to a value enabling such a judgment.

When the signal t is not detected, detection is continued until it is detected (S604, S605). After the signal t is detected (S605), the electromagnet associated with phase n is kept excited until the step time elapses (S606). When the step time has elapsed, n is incremented by one in order to excite an electromagnet associated with next phase n+1 (S607). Control is then returned to step S601, and the electromagnet associated with phase n+1 is excited.

Thus, in order to drive the rotor at a desired speed, it is checked if the rotor is following steps by detecting the signal t, and electromagnets associated with phases are switched and excited when a step time has elapsed.

According to the aforesaid control sequence, before an electromagnet associated with a second phase is excited, it is started to detect a signal t output between a first phase and the second phase. An electromagnet associated with a third phase is then excited based on the detection. Owing to the control sequence, a large electrical angle can be attained and sufficient torque can be exerted.

In the aforesaid embodiments of the present invention, an inner-rotor type motor having a permanent magnet is used as the stepping motor. The present invention is not limited to this type of stepping motor. Alternatively, the present invention can be implemented in an outer-rotor type stepping motor having a rotor on an outer circumference thereof or a hybrid type stepping motor.

As described so far, according to the present invention, a large electrical angle can be attained and sufficient torque can be exerted. Consequently, a stepping motor can be driven fast. Moreover, when the stepping motor is accelerated or decelerated, the orientation of a rotor can be prevented from being recognized incorrectly. Eventually, driving of the stepping motor can be controlled accurately.

Moreover, a stepping motor control unit in accordance with the present invention may be adapted to a print head moving unit and/or paper feeding unit for a printer. Consequently, there is provided a printer in which the time required for printing and/or paper feeding is shortened.

What is claimed is:

1. A stepping motor control unit, comprising:
   (a) an electromagnet having a plurality of excitable phases;
   (b) a rotor assembly having a plurality of slits formed therein, and a plurality of stable positions, each of which corresponds to a respective one of the plurality of phases of the electromagnet;
   (c) a sensing element that detects the position of the rotor assembly, wherein the plurality of slits are positioned on the rotor assembly such that at least one edge of a given slit is offset by a predetermined angle relative to the sensing element when the rotor assembly is in a corresponding stable position, and wherein the sensing element detects the position of the rotor assembly as it rotates between a first stable position and a second stable position at the predetermined angle before the rotor assembly reaches the second stable position relative to the direction of rotation and outputs a detection signal; and
   (d) a control circuit that selectively controls the excitation of each of the plurality of phases of the electromagnet in response to the detection signal and a corresponding one of a plurality of predetermined step times based on the rotational speed of the rotor assembly, wherein the control circuit excites the phase of the electromagnet corresponding to a third stable position of the rotor assembly at a predetermined time after receiving the detection signal.

2. A stepping motor control unit according to claim 1, further comprising:
   (e) a delay circuit that delays the detection signal output by the sensing element by a predetermined delay time based on the rotating speed of the rotor assembly and then outputs the detection signal to the control circuit.

3. A stepping motor control unit according to claim 1, wherein the predetermined angle is an electrical angle within a range of 15° to 35°.

4. A stepping motor control unit according to claim 1, wherein the rotor assembly includes a rotor and a disk fixed to the rotor, wherein the plurality of slits are formed in the fixed disk, and wherein the sensing element comprises an optical sensor that detects light as it selectively passes through each of the plurality of slits and outputs the detection signal based on the detection result.

5. A stepping motor control unit according to claim 1, further comprising a filter, wherein, if a plurality of detection signal pulses are detected by the control circuit during a detection signal detection time, the filter inhibits all but the first pulse detected during the detection signal detection time.

6. A stepping motor control unit according to claim 5, further comprising a recording medium that records the plurality of predetermined step times, a plurality of delay times, and a plurality of detection times, each associated with a corresponding one of the plurality of predetermined step times, wherein the control unit controls the excitation of each of the plurality of phases of the electromagnet in response to the detection signal and the plurality of delay, step and detection times recorded in the recording medium.

7. A stepping motor control unit according to claim 5, wherein each of the plurality of detection times shortens as a rotating speed of the rotor assembly increases proportionally to the step times.

8. A print head moving unit for a printer using a stepping motor control unit set forth in claim 1 to supply power by which a print head of a printer is moved.

9. A paper feeding unit for a printer using a stepping motor control unit set forth in claim 1 to supply power by which a paper feeding mechanism of a printer is driven.

10. A printer having a stepping motor control unit set forth in claim 1.

11. A stepping motor control unit according to claim 1, wherein the at least one edge of the given slit is aligned with the sensing element before the rotor assembly reaches the corresponding stable position.

12. A stepping motor control unit according to claim 1, wherein each slit has first and second radially extending edges, the first radially extending edge of the given slit being offset in a first direction by the predetermined angle relative to the sensing element when the rotor assembly is in the corresponding stable position and the second radially extending edge of the given slit being offset in a second direction opposite the first direction by the predetermined angle relative to the sensing element when the rotor assembly is in the corresponding stable position.

13. A stepping motor control method employing an electromagnet having a plurality of excitable phases, a rotor assembly having a plurality of slits formed therein, and a plurality of stable positions, each of which corresponds to a respective one of the plurality of phases of the electromagnet, and a sensing element that detects the position of the rotor assembly, wherein the plurality of slits are positioned on the rotor assembly such that at least one edge of a given slit is offset by a predetermined angle relative to the sensing element when the rotor assembly is in a corresponding stable position, said method comprising the steps of:
   (a) detecting the position of the rotor assembly at the predetermined angle before the rotor assembly reaches each stable position relative to the direction of rotation and outputting a detection signal; and
   (b) selectively controlling the excitation of each of the plurality of phases of the electromagnet in response to the detection signal and a corresponding one of a plurality of predetermined step times based on the rotational speed of the rotor assembly.

14. A stepping motor control method according to claim 13, wherein the detecting step (a) comprises:
   (a)(1) detecting the rotor assembly as it rotates between a first stable position and a second stable position at the predetermined angle before reaching the second stable position; and wherein the controlling step (b) comprises:
   (b)(1) exciting the phase of the electromagnet corresponding to a third stable position of the rotor assembly at a predetermined time after the control circuit receives the detection signal.

15. A stepping motor control method according to claim 13, further comprising the step of:
   (c) delaying the detection signal output in the detecting step (a) by a predetermined delay time based on the rotating speed of the rotor assembly and then outputting the detection signal to the control circuit.

16. A stepping motor control method according to claim 13, wherein the detecting step (a) comprises:
   (a)(1) filtering all but a first pulse detected during the detection signal detection time if a plurality of detection signal pulses are detected during a detection signal detection time.

17. An information recording medium embodying a program of instructions for controlling a stepping motor that has an electromagnet having a plurality of excitable phases, a rotor assembly having a plurality of slits formed therein, and a plurality of stable positions, each of which corresponds to a respective one of the plurality of phases of the electromagnet, and a sensing element that detects the position of the rotor assembly, wherein the plurality of slits are positioned on the rotor assembly such that at least one edge of a given slit is offset by a predetermined angle relative to the sensing element when the rotor assembly is in a corresponding stable position, the program of instructions comprising:
   (a) instructions on the medium for detecting the position of the rotor assembly at the predetermined angle before the rotor assembly reaches each stable position relative to the direction of rotation and outputting a detection signal; and
   (b) instructions on the medium for selectively controlling the excitation of each of the plurality of phases of the electromagnet in response to the detection signal and a corresponding one of a plurality of predetermined step times based on the rotational speed of the rotor assembly.

18. An information recording medium according to claim 17, wherein the detecting instructions (a) comprises:
   (a)(1) instructions on the medium for detecting the rotor assembly as it rotates between a first stable position and a second stable position at the predetermined angle before reaching the second stable position; and wherein the controlling instructions (b) comprises:
   (b)(1) instructions on the medium for exciting the phase of the electromagnet corresponding to a third stable position of the rotor assembly at a predetermined time after the control circuit receives the detection signal.

19. An information recording medium according to claim 17, further comprising:
   (c) instructions on the medium for delaying the outputted detection signal by a predetermined delay time based on the rotating speed of the rotor assembly and then outputting the detection signal to the control circuit.

20. An information recording medium according to claim 17, wherein the detecting instructions (a) comprises:
   (a)(1) instructions on the medium for filtering all but a first pulse detected during the detection signal detection time if a plurality of detection signal pulses are detected during a detection signal detection time.

* * * * *

UNITED STATES PATENT AND TRADEMARK OFFICE
CERTIFICATE OF CORRECTION

PATENT NO. : 6,259,225 B1
DATED : July 10, 2001
INVENTOR(S) : Yoshiharu Matsumoto It is certified that error appears in the above-identified patent and that said Letters Patent is hereby corrected as shown below:

<u>Title page,</u>
Item [86], PCT No. §371 Date: change "August 9, 1999" to -- August 5, 1999 --.

Signed and Sealed this

Third Day of December, 2002

JAMES E. ROGAN
*Director of the United States Patent and Trademark Office*